United States Patent

Reaney

[11] Patent Number: 4,974,363
[45] Date of Patent: Dec. 4, 1990

[54] VEHICLE DOOR ASSEMBLY
[75] Inventor: Derek J. Reaney, Nuneaton, United Kingdom
[73] Assignee: Jaguar Cars Limited, England
[21] Appl. No.: 230,013
[22] Filed: Aug. 8, 1988
[30] Foreign Application Priority Data
Aug. 7, 1987 [GB] United Kingdom ............... 8718787
[51] Int. Cl.⁵ .............................................. E05F 11/38
[52] U.S. Cl. ........................................ 49/374; 49/442
[58] Field of Search ................. 49/374, 226, 227, 442, 49/440, 502, 376

[56] References Cited
U.S. PATENT DOCUMENTS

| 4,306,381 | 12/1981 | Presto . | |
| 4,615,143 | 10/1986 | Isetani | 49/374 |
| 4,648,205 | 3/1987 | Ono | 49/374 |
| 4,658,546 | 4/1987 | Moriyama | 49/374 |
| 4,662,115 | 5/1987 | Ohya et al. . | |
| 4,711,052 | 12/1987 | Maeda et al. | 49/502 |
| 4,823,507 | 4/1989 | Miller | 49/374 |

FOREIGN PATENT DOCUMENTS

| 0148987 | 7/1985 | European Pat. Off. . |
| 1509211 | 1/1969 | Fed. Rep. of Germany . |
| 3104681 | 12/1981 | Fed. Rep. of Germany . |
| 513292 | 10/1939 | United Kingdom . |
| 830723 | 3/1960 | United Kingdom . |
| 2117329 | 10/1983 | United Kingdom . |
| 2119839 | 11/1983 | United Kingdom . |

Primary Examiner—Kenneth J. Dorner
Assistant Examiner—Gerald A. Anderson
Attorney, Agent, or Firm—Davis, Bujold & Streck

[57] ABSTRACT

A vehicle door assembly comprises a door hardware assembly which includes a quarterglass frame and two lower sideglass guides. The quarterglass frame is formed with an upper sideglass guide and the sideglass is provided with three guide pins which engage with the upper sideglass guide and the lower sideglass guides. This arrangement enables the sideglass guides to have differing degrees of curvature.

4 Claims, 3 Drawing Sheets

VEHICLE DOOR ASSEMBLY

FIELD OF THE INVENTION

The present invention relates to a vehicle door assembly and more particularly relates to a vehicle door assembly in which the sideglass is provided with guide pins which engage with sideglass guides.

DESCRIPTION OF PRIOR ART

In known vehicle door assemblies it is conventional to provide sideglass guides which engage along at least one edge of the sideglass This restricts the sideglass to a planar or constantly curved path because of the extended engagement between the sideglass and the guides. With the increasing complexity of shape of vehicle bodies it is no longer always convenient to restrict the movement of the sideglass in this way and there is a requirement for a more flexible mounting system. It is also conventional to assemble a vehicle door by securing together a door outer panel and a door inner panel to produce a door carcase and to assemble the remaining components of the door individually to the door carcase. However, such a method of assembly is time-consuming and expensive and results in a vehicle door which is difficult to service should any faults develop.

OBJECT OF THE INVENTION

It is an object of the present invention to provide a vehicle door assembly which incorporates a more flexible sideglass mounting system. It is a further object of the invention to provide a simplified vehicle door assembly.

SUMMARY OF THE INVENTION

According to the present invention there is provided a vehicle door assembly including a quarterglass frame and two lower sideglass guides, wherein the quarterglass frame is formed with an upper sideglass guide and a sideglass is provided with three guide pins which engage with the upper sideglass guide and the two lower sideglass guides.

The curvature of the upper sideglass guide may be different to the curvature of the lower sideglass guides.

The curvature of each of the lower sideglass guides may be different.

The door hardware assembly may be secured to a door panel assembly comprising a door outer panel secured to a substantially U-shaped door reinforcing assembly. The free ends of the U-shaped assembly may be interconnected by means of a side intrusion assembly For a better understanding of the present invention and to show more clearly how it may be carried into effect reference will now be made by way of example, to the accompanying drawings in which:

DESCRIPTION OF PREFERRED EMBODIMENTS

Figures 1, 4:
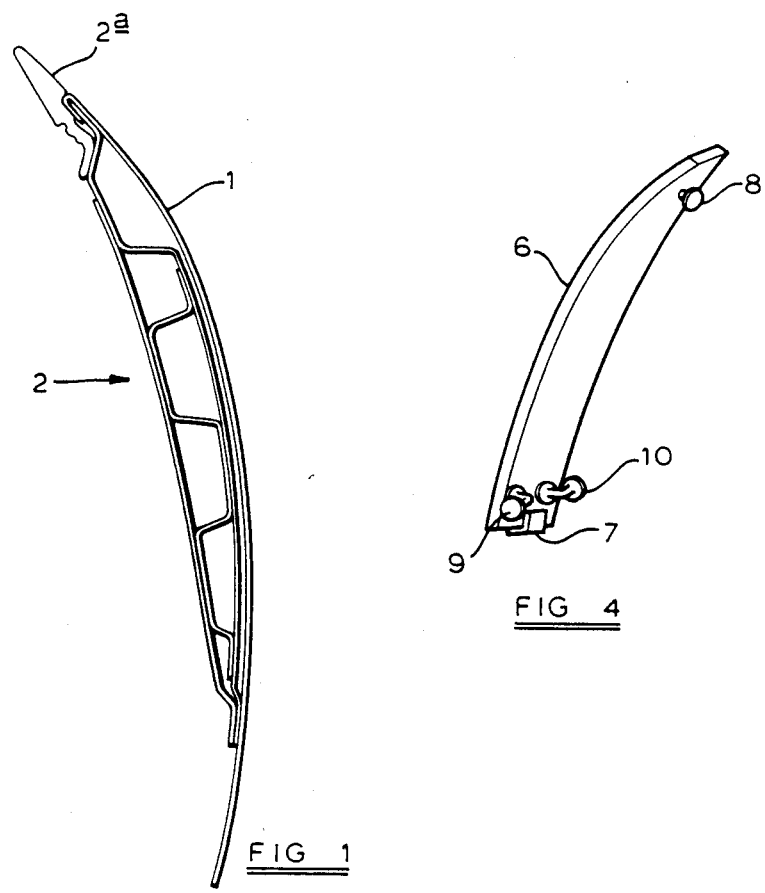
FIG. 1 is a diagrammatical cross-sectional view of a part of a vehicle door.
FIG. 4 is an end view of a sideglass assembly.
Figure 2:
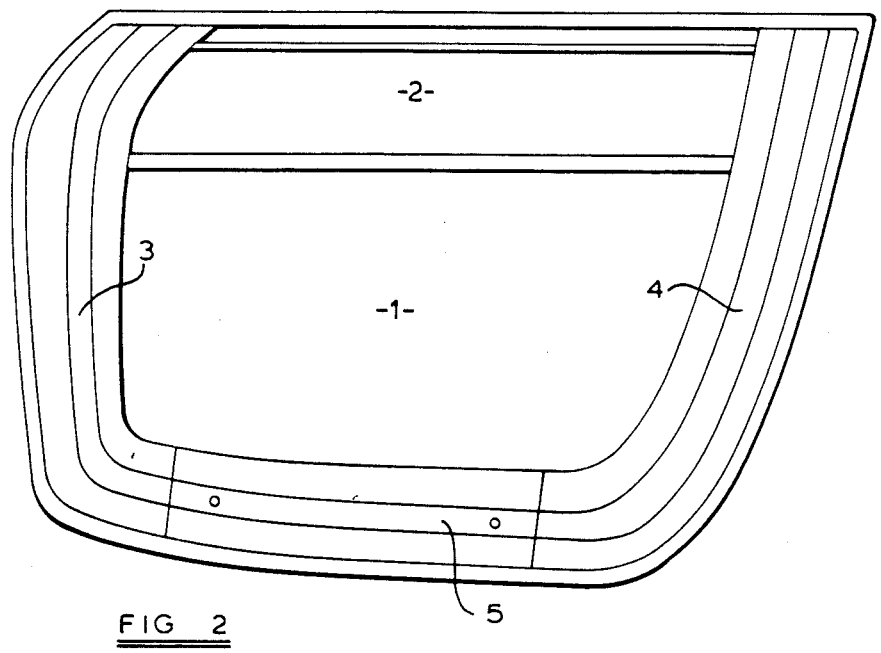
FIG. 2 an elevational view of a part of a vehicle door.
Figure 3:
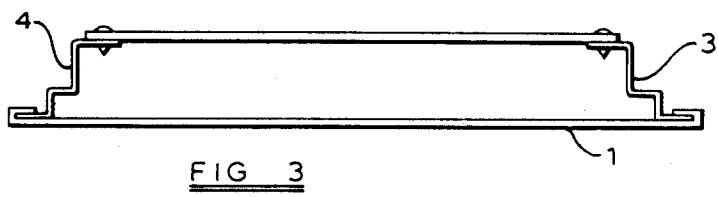
FIG. 3. a cross-sectional view of a door outer panel and a door reinforcing assembly.

FIGS. 1 to 3 show a vehicle door assembly which comprises a door outer panel 1 which is secured to a door reinforcing assembly by means of welding and by clinching the edges of the door outer panel around outwardly extending portions of the door reinforcing assembly.

The door reinforcing assembly comprises a side intrusion assembly 2, a hinge mounting panel 3 incorporating a hinge reinforcement (not shown), a latch mounting panel 4 and a lower seal reinforcing panel 5. The components of the door reinforcing assembly are mounted in a jig and are welded together to form a generally U-shaped assembly with the free ends of the U joined together by way of the side intrusion assembly 2.

At this stage the door assembly can be attached to a vehicle body by way of tapered split hinges, adjusted as required and can subsequently be removed from the vehicle body and replaced without requiring any further adjustment.

To the vehicle door assembly which has been adjusted and removed from the vehicle body is added an exterior door handle assembly, a latch, an exterior mirror, a secondary sealing system, an external waist seal 2a and a check arm assembly although some of these components are not shown on the drawings. The check arm assembly is preferably biased towards the upper hinge to minimise door lift or door drop as a result of wear and thus to maintain the integrity of the door seals.

A sideglass assembly is shown in FIG. 4 and comprises a sideglass 6 to which there is bonded a glass carrier 7 and three guide pins 8, 9 and 10. The sideglass, glass carrier and guide pins are assembled together in a jig to ensure accurate assembly and may be bonded together using an adhesive such as that sold under the trade mark SIKAFLEX or the like.

Figure 5:
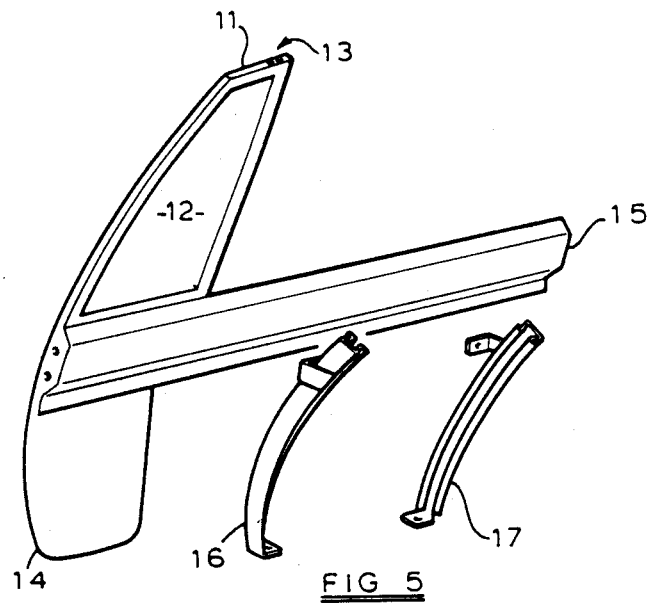
FIG. 5 is an exploded view of a part of a door hardware assembly.
Figure 6:
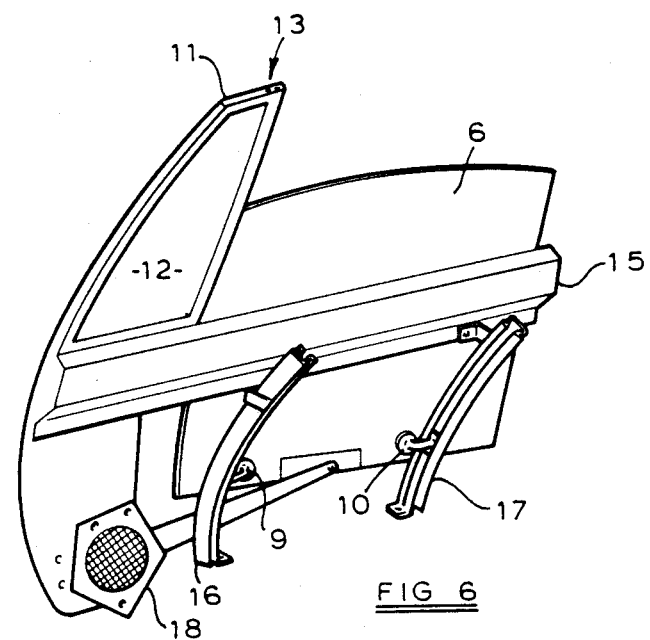
FIG. 6 is a further view of the door hardware assembly shown in FIG. 5.

A door hardware assembly is shown in FIGS. 5 and 6 and comprises a quarterglass frame 11 pressed or extruded, for example from aluminum, and having a quarterglass 12 mounted therein. The quarterglass frame 11 also serves as an upper guide for receiving the guide pin 8 of the sideglass assembly when installed. For this purpose, quarterglass frame 11 is provided with a generally T-shaped slot 13 for receiving the guide pin 8. A door pressing assembly 14 and an inner waist reinforcement 15 are secured to the quarterglass frame 11, for example by welding, and lower sideglass guides 16 and 17 for receiving the guide pins 9 and 10 are secured to the inner waist reinforcement 15. The components of the door hardware assembly are assembled in a jig and are then bolted together.

The sideglass assembly is assembled to the door hardware assembly together with other door components such as a regulator assembly, loud speaker 18, inner waist seal, switch pack, electric door module and upper and lower glass stops.

Thus the vehicle door now comprises a vehicle door assembly as described with reference to FIGS. 1 to 3 and a modular door hardware assembly as described with reference to FIGS. 4 to 6 which is assembled remote from the door. To complete the vehicle door the door hardware assembly is assembled to the vehicle door assembly and a door casing and armrest assembly are secured to the door reinforcing assembly.

With the vehicle door construction described above, it is possible to assemble a vehicle door as two components, a vehicle door assembly and a door hardware assembly, and to combine the two assemblies to substantially complete the construction of the door.

The alignment of the glass can be completed once the door has been replaced on the vehicle body by adjusting the end and lower fixings of the door hardware assembly.

As described above the sideglass 6 carries three guide pins 8, 9 and 10. In contrast to conventional sideglass guides, the sideglass itself is not mounted in a guide along an entire edge thereof, but is supported at three points by the guide pins 8, 9 and 10 which are carried in sideglass guides. Where a conventional sideglass and guide arrangement requires that the sideglass be planar or have a constant curvature to conform to the curvature of the guide, the present arrangement shown in the drawings permits each guide pin to follow an independent path which may be planar, have a constant curvature or even have a varying degree of curvature if required. To this end the lower sideglass guides 16 and 17 may have the same or different curvatures as required and may have the same or different curvatures compared with the upper sideglass guide.

I claim:

1. A vehicle door assembly comprising a door hardware assembly including a sideglass, a quarterglass frame and two lower sideglass guides, wherein:
   the quarterglass frame is formed with an upper sideglass guide which is curved in the direction of the thickness of the sideglass;
   the two lower sideglass guides are each curved in the direction of the thickness of the sideglass, the curvature of each of the lower sideglass guides being different to the curvature of the upper sideglass guide; and
   the sideglass is mounted in each of the sideglass guides by way of a guide pin, which guide pins alone guide the sideglass in the direction of the thickness of the sideglass during movement of the sideglass upwardly and downwardly.

2. A vehicle door assembly as claimed in claim 1, wherein the curvature of each of the lower sideglass guides is different.

3. A vehicle door assembly as claimed in claim 1, wherein the door hardware assembly is secured to a door panel assembly comprising a door outer panel secured to a substantially U-shaped door reinforcing assembly.

4. A vehicle door assembly as claimed in claim 3, characterised in that the free ends of the U-shaped assembly are interconnected by means of a side intrusion assembly.

* * * * *